United States Patent [19]

Schonewald

[11] 3,888,961
[45] June 10, 1975

[54] BLOW MOLDING PROCESS INCLUDING ARTICLE COOLING

[75] Inventor: Roger L. Schonewald, Belle Mead, N.J.

[73] Assignee: Ingersoll-Rand Company, Woodcliff Lake, N.J.

[22] Filed: Nov. 12, 1973

[21] Appl. No.: 414,994

Related U.S. Application Data

[62] Division of Ser. No. 295,591, Oct. 6, 1972, Pat. No. 3,807,927.

[52] U.S. Cl. .................. 264/89; 264/98; 264/237; 264/348
[51] Int. Cl. ..................... B29c 17/07; B29c 25/00
[58] Field of Search ............ 264/89, 90, 92, 93, 94, 264/96, 97, 98, 99, 237, 348; 425/DIG. 208, 446

[56] References Cited
FOREIGN PATENTS OR APPLICATIONS
1,960,129   7/1970   Germany .............................. 264/94

Primary Examiner—Jan H. Silbaugh
Attorney, Agent, or Firm—Robert R. Paquin

[57] ABSTRACT

Molding processes particularly suited for blow molding a hollow article of plasticized material is cooled by repeatedly causing the pressure of fluid internally of the article to be alternately decreased and increased whereby, repeatedly, fluid is alternately discharged from, and supplied to, the interior of the article.

8 Claims, 4 Drawing Figures

PATENTED JUN 10 1975

3,888,961

BLOW MOLDING PROCESS INCLUDING ARTICLE COOLING

This is a division, of application Ser. No. 295,591 filed Oct. 6, 1972, now U.S. Pat. No. 3,807,927.

The present invention relates generally to the molding of hollow articles from plasticized material and more particularly to the cooling of hollow articles such as formed by blow molding.

Conventionally, the longest portion of a blow molding cycle is the cooling portion during which the blown article is cooled from molten state to a temperature at which it is capable of being discharged from the mold without subsequent distortion. For example, the blow molding of a 1 gallon container from high density polyethylene typically requires around a 15 second cycle, about 10 seconds of which are necessitated for cooling of the blown container; and the blowing of a 55 gallon barrel typically requires a cycle of 3 minutes with around 2½ minutes of the cycle being needed for cooling of the blown barrel. During the cooling portion of the cycle, the outer wall of the blown article is, of course, normally satisfactorily cooled by heat transfer to the surrounding wall of the mold; however, the low thermal conductivity of the plasticized material impedes cooling of the interior portions of the article by heat transfer to the mold, thereby greatly contributing to a requisite long cooling time and frequently making blow molding of relatively thick walled parts impractical.

Attempts have been made to shorten the cooling time by (1) supplying carbon dioxide internally of the article, (2) spraying water internally of the article, and (3) continuously circulating pressurized fluid through the interior of the article. However, the relatively large cost of carbon dioxide can only be justified in those instances in which its application results in a commensurate relatively great decrease in cycle time; and the employment of a water spray adversely affects the quality of the blown article. Moreover, the continuous circulation of fluid through the article requires the employment of a vent connection separate from the blow nozzle, and such vent connection is inherently suseptible to plugging and other problems.

An object of the present invention is to provide new and improved processes particularly adapted for cooling hollow articles of plasticized material in a relatively short time period.

Another object of the invention is to provide new and improved processes of the type set forth which, due to their relatively rapid cooling of the article, facilitate the molding of relatively thick walled articles.

Another object is to provide new and improved processes of the type set forth particularly adapted for cooling an article by repeatedly causing the pressure of fluid internally of the article to fluctuate whereby, repeatedly, fluid is alternately supplied to and discharged from the article.

Another object is to provide new and improved processes of the type set forth which are particularly adapted to avoid the necessity for connection to a blown article of vents and/or other conduits additional to the blow nozzle.

Another object is to provide new and improved processes of the type set forth particularly adapted for permitting the blowing fluid itself to provide the cooling.

Another object is to provide new and improved processes of the type set forth which, although particularly suited for cooling articles formed by blow molding, are alternatively capable of cooling hollow articles formed by other processes such as, for example, the vacuum forming processes.

Other objects and advantages will be apparent from the following description taken in connection with the accompanying drawings wherein, as will be understood, the preferred embodiments of the invention have been given by way of illustration only.

In accordance with the invention, a process for forming a hollow article from plasticized material may comprise the step of cooling the article by repeatedly causing fluid to be alternately discharged from the article and supplied thereto.

Referring to the drawings.

Figure 1:
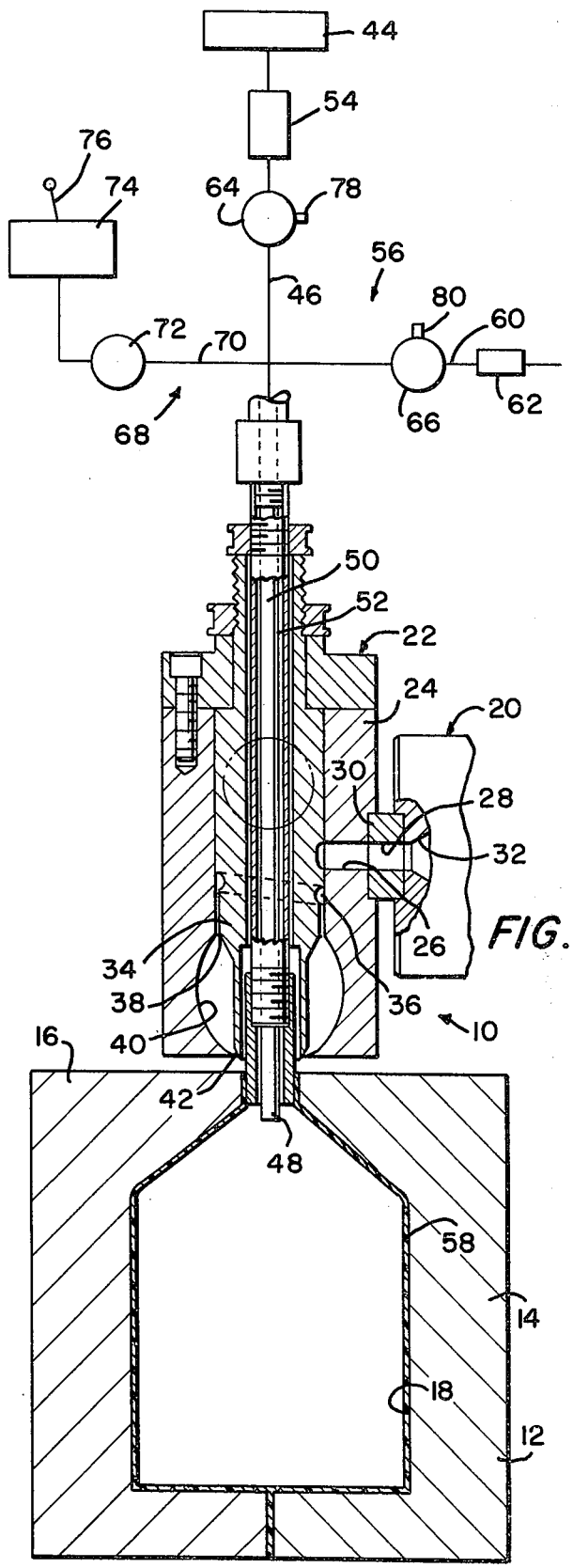
FIG. 1 is a view schematically illustrating a blow molding apparatus including one embodiment of the invention.
Figure 2:
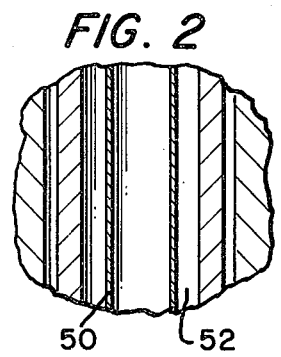
FIG. 2 is an enlarged, fragmentary view of the portion of such apparatus shown encircled in FIG. 1.
Figure 3:
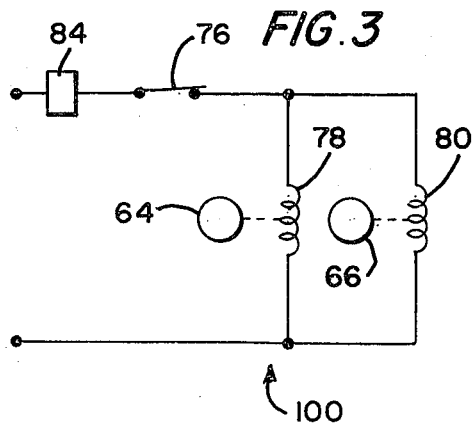
FIG. 3 is a view schematically illustrating the electrical circuitry of the operating means of the embodiment of the invention included in such apparatus.

Referring more particularly to the drawings wherein similar reference characters designate corresponding parts throughout the several views, FIG. 1 illustrates a blow molding apparatus, designated generally as 10, comprising a two-part mold 12 which includes the usual complementary mold halves or sections 14,16 cooperative to define a mold cavity 18 contoured to the configuration of the article to be blown. The mold halves 14,16 are, during operation of the apparatus, cyclically driven towards-and-away from one another in the conventional manner between illustrated, adjacent, mold closed positions and spaced apart, mold open positions.

The molding apparatus 10 further comprises an injection unit, shown fragmentarily as 20, and a die head 22 which contains hereinafter described, plasticized material supply passage means for communicating the injection unit 20 with the mold 12. The injection unit 20, per se, may be of any desired conventional construction such as, for example, that described in U.S. Pat. No. 2,734,226, issued Feb. 14, 1956; and, as will be understood, the timing of the operating cycle of the injection unit 20 is such as to cause a parison of plasticized material to be discharged by the die head 22 when the mold halves 14,16 are in their beforedescribed spaced apart, mold open positions. The die head 22 comprises a die head housing 24 containing a radial bore 26 which communicates through a bore 26 in an adaptorconnector 30 with the injection unit outlet 32 to receive the plasticized material periodically discharged through the latter. The die head 22 also comprises an annular mandrel 34 which extends coaxially through the die head housing 24 and includes peripheral arcuate passage means 36 communicating with the radial bore 26 for receiving the plasticized material therefrom. The lower end of the arcuate passage means 36 communicates through an annular space 38 and a therebelow chamber 40, both defined intermediate the mandrel 34 and the housing 24, with the annular, die head discharge orifice 42. The discharge orifice 42 is, as conventionally, located to discharge a therethrough passing, annular parison of plasticized material intermediate the mold halves 14,16 when the latter are in their mold open positions; and the die head 22, as will be understood, is provided with a conventional stripper or discharge means (not shown) adapted to discharge a blown article.

The apparatus 10 also comprises a source or reservoir 44 of pressurized air or other pressurized blowing fluid and conduit means 46 communicating the source 42 through the blow nozzle 48 with the mold cavity 18 internally of an annular parison supplied through the orifice 42. The conduit means 46 includes a portion defined by a relatively thin walled stainless steel tubular member 50 extending coaxially through the mandrel 34 of the die head 22 spaced therefrom by a surrounding, annular, insulating air space 52 precluding undesirable heating of the fluid flowing through the tubular member 50 by the die head 22. Also, in the event that cooling of the fluid during its supply is desired, a cooler 54 may be interposed in the conduit means 46. The cooler 54 may, of course, be of any suitable conventional construction such as, for example, a direct exchange cooler and, hence, no detailed description thereof is believed to be necessary.

In accordance with the present invention, the blow molding apparatus 10 comprises cooling means, designated generally as 56, for repeatedly causing the pressure of blowing fluid within a blown article 58 in the mold 12 to be alternately increased and decreased, whereby repeatedly fluid is alternately supplied into, and discharged from, such blown article 58 for cooling the article 58.

More particularly, as illustrated, the cooling means 56 of the apparatus 10 comprises exhaust means in the form of an exhaust conduit 60, communicating with the atmosphere to discharge pressurized fluid thereto, which contains a muffler 62 and is connected to the conduit means 46 intermediate the die head 22 and the fluid source 44 to communicate through the conduit means 46 and the blow nozzle 48 with the interior of a blown article 58 in the mold 12. The cooling means 56 further comprises a solenoid operated valve 64, per se of conventional construction, interposed in the conduit means 46 intermediate the source 44 and the connection of the exhaust conduit 60 to the conduit means 46, and a solenoid operated valve 66, again per se of conventional construction, interposed in the exhaust conduit 60. The valves 64 and 66 are normally closed and normally open, respectively, when their solenoids 78,80 are un-energized, the solenoids 78,80 being connected in an electrical circuit 100 to be energized during operation of the apparatus 10. The valves 64,66, as will be seen, cooperate to serve as a control means operable to alternately permit supply of pressurized fluid from the source 44 through the conduit 46 and blow nozzle 48 internally of an article 58 in the mold 12 and discharge of pressurized fluid from internally of such article 58 to the atmosphere through the blow nozzle 48, conduit means 46 and exhaust conduit 60.

In addition, the cooling means 56 comprises operating means, designated generally as 68, for operating such control means to repeatedly cause said alternate flows of fluid. This operating means 68, as illustrated, comprises a conduit 70 connected to the conduit means 46 intermediate the die head 22 and the valve 64 to receive pressurized fluid from the conduit means 46, and a restrictor valve 72 interposed in the conduit 70 and adjustable for varying the fluid flow permitted therethrough. The operating means 68 also comprises a receiver 74 connected to the conduit 70 to receive the pressurized fluid therefrom and a normally closed, operating switch 76 operatively associated with the receiver 74 to be automatically opened responsive to the attainment of a predetermined pressure of fluid in the receiver 74. The operating switch 74 is connected in the electrical circuit 100 with the valve solenoids 78,80 to cause such solenoids 78,80 to be de-energized upon its opening. Thus, upon the attainment of such predetermined pressure in the receiver 74, the valve 64 is automatically closed while the valve 66 is simultaneously automatically opened, thereby preventing supply of pressurized fluid from the source 44 internally of the blown article 58 in the mold 12 while permitting discharge of pressurized fluid from internally of such a blown article 58 through the exhaust conduit 60. During such exhausting of the fluid, of course, fluid is similarly exhausted from the receiver 74 through the conduits 70,60, whereby, after the pressure of the fluid in the receiver 74 has been reduced to a lower predetermined pressure, the operating switch 76 is automatically shifted to de-energize the solenoids 78,80 whereby the valves 64,66 are, respectively, resultantly opened and closed.

During the operation of the blow molding apparatus 10, with the mold halves 14,16 in their mold open positions, plasticized material discharged through the injection unit outlet 32 passes through the die head supply passage means comprising the bores 28,26, the passage means 36, the space 38 and the chamber 40, and is discharged through the die head discharge orifice 42 in the configuration of a tubular parison intermediate the mold halves 14,16. The mold halves 14,16 then are moved to their illustrated mold closed positions whereupon they cooperate to seal the lower end of the parison. The solenoids 78,80 are then energized by the conventional timer 84 normally present in a blow molding apparatus to cause pressurized blowing fluid from the reservoir 44 to be supplied through the conduit means 46 and blow nozzle 48 internally of the parison in the mold 12 whereby such pressurized fluid blows the parison to the configuration of the illustrated article 58. During such supply of the pressurized fluid, a minor portion of the fluid flows from the conduit means 46 through the conduit 70 and restrictor valve 72 to the receiver 74, the flow rate at which such minor portion so flows, being, of course, readily controllable by adjustment of the restrictor valve 72, Fluid flow from the conduit means 46 through the exhaust conduit 60 is, of course, at this time prevented by the closed valve 66.

When the pressure of the fluid in the receiver 74 attains a predetermined pressure sufficient to open the pressure switch 76, the latter de-energizes the solenoids 78,80 to cause the valve 64 to be closed and the valve 66 to be opened. Hence, although pressurized fluid from the source 44 is then prevented from flowing internally of the blown article 58, pressurized fluid already internally of the article 58 is permitted to discharge therefrom through the conduit means 46 and the exhaust conduit 60. Simultaneously, of course, pressurized fluid is discharged from the receiver 74 through the valve 72 and conduits 60,70, thereby reducing the pressure of the fluid in the receiver 74; and subsequently the pressure of the fluid in the receiver 74 resultantly falls to a sufficiently low value that the pressure switch 76 is closed. Hence, the solenoids 78,80 are energized to thereby cause opening of the valve 64 and closing of the valve 66, whereupon pressurized fluid is again supplied from the source 44 internally of the blown article 58. Repeatedly, pressurized fluid is in such manner alternately supplied from the source 44 internally of the article 58 and discharged from internally of the article 58 through the exhaust conduit 60, the rate of such alternate supply and discharge of pressurized fluid being determined by the setting of the restrictor valve 72; and the blown article 58 is resultantly cooled as heat is removed by the fluid discharged from internally thereof. After a predetermined time period set into the timer 84, the timer 84 causes the power to the pressure switch 76 and solenoids 78,80 to be shut off, whereupon the valves 64,66 are resultantly closed and opened, respectively; and, after the mold halves 14,16 have been again moved to their mold open positions and the blown article 58 discharged from the mold 12, the timer 84 causes the solenoids 78,80 to be again energized whereupon the apparatus 10 then commences with the next operating cycle which proceeds in the described manner.

Hence, during the operation of the apparatus 10, each blown article 58 is cooled in the mold 12 by repeatedly causing the pressure of blowing fluid internally of the article 58 to be alternately decreased and increased whereby, repeatedly, blowing fluid is alternately discharged from, and supplied to the interior of the article 58. The optimum range of the pressures created internally of the article 58 during this cooling and the optimum frequency at which the pressures are fluctuated, are of course both variable in different applications of the invention. However, as will be understood, the maximum pressure created internally of the article 58 should be such that the fluid is still sufficiently dense for meaningful cooling; and the minimum pressure employed during the cooling should be sufficiently high to prevent injury to the surface finish of the article 58. Hence, for example, the fluid pressures created in the article 58 may typically be between 100 and 80 psi. Again, by way of example, the frequency at which the fluid pressure is fluctuated may in some applications of the invention be several times per second while in other applications only once every few seconds.

Figure 4:
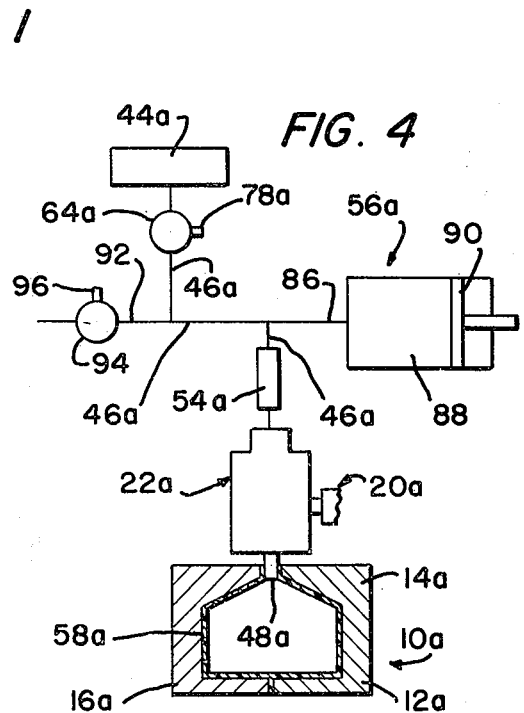
FIG. 4 is a fragmentary view schematically illustrating a blow molding apparatus including a second embodiment of the invention.

FIG. 4, wherein parts similar to those of the apparatus 10 are designated by corresponding reference characters followed by the suffix a, schematically illustrates a blow molding apparatus 10a including an embodiment of the invention in the form of a cooling means designated generally as 56a. The cooling means 56a is similar to the cooling means 56 in that it repeatedly causes the pressure of pressurized fluid within a blown article 58a in the mold 12a to be alternately increased and decreased whereby repeatedly pressurized fluid is alternately supplied into, and discharged from, the interior of the article 58a for cooling the article 58a. The cooling means 56a is, however, particularly adapted for conserving fluid during the cooling of the article 58a and, hence, particularly useful when the blowing fluid is other than relatively inexpensive pressurized air.

The cooling means 56a comprises a conduit 86 connected to the conduit means 46a intermediate the die head 22a and the fluid source 44a to communicate through the conduit means 46a and blow nozzle 48a with the interior of a blown article 58a in the mold 12a. The cooling means 56a further comprises a receiver 88 at one end connected to the conduit 86 and a piston 90 which is slidably disposed in the receiver 88 and, throughout the cooling of the article 58a, cylically driven through a conventional crank (not shown) towards-and-away from the connection of the receiver 88 to the conduit 86. In addition, the cooling means 58a includes an exhaust conduit 92, containing a normally closed solenoid operated valve 94, which is connected to the conduit means 46a intermediate the die head 22a and the fluid source 44a for communicating the conduit means 46a with the atmosphere or another suitable receiver for exhausted pressurized fluid. The solenoid operated valve 64a in the conduit means 46a is, as will be understood, normally open to permit fluid flow from the source 44a through the blow nozzle 48a; however, the solenoids 78a,96 for the valves 64a, 94 are electrically connected to the conventional blow molding timer (not shown) to cause the valves 64a,94 to be cyclically shifted in the following described manner.

In the operation of the apparatus 10a, with the valve 64a open and the valve 94 closed, pressurized blowing fluid is supplied from the source 44a through the conduit means 46a and blow nozzle 48a to form a tubular parison of plasticized material in the mold 12a to the configuration of the blown article 58a. A minor portion of the pressurized fluid passing through the conduit means 46a, of course, flows through the conduit 86 to the receiver 88 and, as the piston 90 is not at this time cyclically driven through the crank (not shown), fills the receiver 88 while driving the piston 90 away from the connection of the conduit 86 thereto.

After the article 58a has been thus formed, the valve 64a is closed by the machine timer and the piston 90 is then cyclically driven towards-and-away from the conduit 86 through its crank (not shown). Thus, the pressure of pressurized fluid internally of the article 58a is resultantly, alternately increased and decreased while repeatedly pressurized fluid is alternately supplied into, and is discharged from, the interior of the blown article 58a for cooling the latter. The pressures thereby created internally of the article 58a and the frequency of the created pressure fluctuations therein are again, of course, variable in different applications of the invention, but subject to the general guidelines hereinbefore set forth.

After the predetermined cooling of the article 58a, the valve 94 is opened by the machine timer to exhaust pressurized fluid from the article 58a, conduit means 46a, conduit 86 and receiver 88 and then closed. Then, after another tubular parison of plasticized material has been supplied to the mold 12a and the mold halves 14a,16a closed on such parison, the valve 64a is reopened to commence blowing of another article 58a; and cyclically the operation of the apparatus 10a proceeds in the beforedescribed manner.

From the preceeding description it will be seen that the invention provides new and improved molding processes which may comprise the steps of forming an article in a mold to predetermined configuration and cooling the article while in the mold by repeatedly causing the pressure of fluid in the article to be alternately increased and decreased whereby, repeatedly, fluid is alternately supplied to, and discharged from, the interior of the article. Also, it will be seen that in these processes the fluid may be cooled prior to its supply into the article, and the fluid may be supplied in a manner precluding its heating during the supply.

From the preceeding description it will be seen that the invention provides new and improved processes for accomplishing all of the beforestated objects and advantages. It will be understood, however, that, although only two embodiments of the invention have been illustrated and hereinbefore specifically described, the invention is not limited merely to these two illustrated and described embodiments, but rather contemplates other embodiments and variations within the scope of the following claims.

Having thus described my invention, I claim:

1. A blow molding process comprising the steps of providing a hollow parison of plasticized material in a mold cavity contoured to the predetermined configuration of the hollow article to be blown, forming said parison in said mold cavity into a hollow article of said predetermined configuration of said mold cavity by pressurized blowing fluid supplied internally thereof, thereafter initiating cooling of said previously blown hollow article while in the mold cavity by repeated and alternate discharge of cooling fluid from, and supply of cooling fluid into, the interior of said blown hollow article, whereby repeatedly the pressure of fluid in said blown hollow article is resultantly alternately decreased and increased and, during said cooling of said blown hollow article, maintaining a minimum fluid pressure therein sufficiently high to prevent injury to the surface of said blown hollow article.

2. A blow molding process according to claim 1, wherein during said cooling, the pressure of the fluid internally of the article is caused to fluctuate at a predetermined frequency over a predetermined pressure range.

3. A blow molding process according to claim 1, wherein the cooling fluid is cooled prior to its supply into the article.

4. A blow molding process according to claim 1, wherein said fluid supply-and-discharge for said cooling is accomplished by repeatedly connecting a source of pressurized fluid and an exhaust for such fluid alternately to the interior of the article.

5. A blow molding process according to claim 1, wherein said fluid supply-and-discharge for said cooling is accomplished by employment of piston means.

6. A blow molding process according to claim 1, wherein said cooling fluid is supplied to, and discharged from, said hollow article through at least a portion of the conduit means serving to supply said blowing fluid to said parison.

7. A blow molding process according to claim 6, wherein said blowing fluid is employed as said cooling fluid.

8. A blow molding process according to claim 1, wherein said cooling fluid is supplied into, and discharged from, the interior of said hollow article through relatively thin walled tubing insulated from thereadjacent structure.

* * * * *